United States Patent Office 2,786,030
Patented Mar. 19, 1957

2,786,030

DETERGENT LUBRICATING OILS

Troy L. Cantrell, Drexel Hill, and Herschel G. Smith, Wallingford, Pa., assignors to Gulf Oil Corporation, Pittsburgh, Pa., a corporation of Pennsylvania No Drawing. Application April 13, 1954,
Serial No. 422,976

5 Claims. (Cl. 252—42.7)

This invention relates to mineral oil lubricant compositions containing detergent additives. As is known in the art, detergent additives are incorporated in mineral oil lubricant compositions to suspend or disperse deterioration products or contaminating materials developed during use of the lubricant, as well as to prevent ring sticking and the formation of engine deposits.

In accordance with our invention, we add to a mineral oil lubricant composition a minor amount, sufficient to confer detergency properties, of an alkaline earth metal salt of a condensation product of 2 mols of a monoalkylated monohydric phenol having at least four carbon atoms in the alkyl group, 2 mols of a lower alkanol, 2 mols of carbon disulfide and from 2 to 3 mols of formaldehyde. These condensation products are excellent additives, and in addition to conferring detergency properties, act as bearing corrosion and rust inhibitors.

The condensation products of our invention are oil-soluble resinous materials incorporating in a unitary product alkaline earth metal and sulfur. They are prepared by forming a condensation reaction product of the phenol, alkanol, formaldehyde and carbon disulfide in the proportions stated, an alkaline earth metal hydroxide, e. g., calcium, barium, magnesium or strontium hydroxide, being employed in the proportion of 1 mol to obtain the metal salts. Although in preparing the additives the reaction proceeds spontaneously at room temperature, it is preferred to employ moderately elevated temperatures, particularly in the last stages of the reaction. As a final step, the temperature is raised to dehydrate the product, i. e., to distill off the water formed in the reaction and added with the reactants. A dehydration temperature of about 280° F. is suitable. It is advantageous to employ a naphtha or mineral lubricating oil as a reaction medium in order to obtain the final product in the form of a concentrated solution suitable for blending with various mineral oils.

The monohydric monoalkylated phenols employed as a reactant have at least four carbon atoms in the alkyl group. For example, such straight and branched chain alkyl groups as butyl, amyl, heptyl, octyl, nonyl, decyl, stearyl, cetyl and the long chain groups derived from paraffin wax are suitable. The alkyl groups containing from four to twelve carbon atoms form a preferred class. A preferred phenol is tetramethylbutyl phenol, obtained by the alkylation of phenol with diisobutylene in known manner.

The lower alkanols include methyl, ethyl, propyl, isopropyl, butyl, sec-butyl, amyl and iso-amyl alcohols. Mixtures of these alkanols can also be employed. Ethyl alcohol is a preferred alkanol.

The formaldehyde employed in the condensation reaction is most conveniently used in the form of commercial aqueous formalin, containing 37 percent by weight of formaldehyde. In performing the condensation reaction, it is convenient to disperse or dissolve the alkaline earth metal hydroxide either in water or in the aqueous formaldehyde solution.

The following example is illustrative of the preparation of one of the condensation products of this invention. Unless otherwise stated, all parts are by weight.

*Example I.*—Into a reaction vessel, there were charged 40.3 parts of tetramethylbutyl phenol, 132 parts of a mineral lubricating oil having a viscosity of about 155 S. U. S. at 100° F., 16 parts of carbon disulfide, 11 parts of Formula 30 specially denatured alcohol, 13 parts of formalin and 7.4 parts of calcium hydroxide in a water slurry. Formula 30 alcohol consists of a mixture of 10 gallons of pure methyl alcohol and 100 gallons of 95 percent by volume ethyl alcohol. The mixture was agitated at room temperature for one hour. Then, with continued agitation, the temperature was gradually raised to 280° F. until all water had been distilled off and the product was dehydrated. Thereafter the solution obtained was filtered. The mineral oil solution of the resin thus prepared had the following properties:

| | |
|---|---|
| Gravity, °API | 21.7 |
| Viscosity, SUS 210° F | 76.6 |
| Color, ASTM union | 7.5 |
| Sulfur, B, percent | 0.65 |
| Neutralization No | 5.44 alkaline |
| Ash as Sulfate, percent | 4.31 |

The metal and sulfur containing resinous condensation products of our invention are excellent addition agents. They are readily soluble in all types of mineral lubricating oils and can be blended with them in high proportions. They confer excellent detergent effects and rust inhibiting properties on the mineral lubricating oils in which they are incorporated, and are good bearing corrosion inhibitors. For these purposes, the condensation products are added to mineral oil lubricants in minor amounts, from about 0.1 to about 25 percent by weight, sufficient to confer improved detergency properties. Generally, the addition of about 1 to 2 percent by weight of the condensation products is sufficient to effect the desired improvement, but for heavy duty applications larger amounts are employed.

Illustrative of the use of the condensation products of this invention in lubricating oils, a motor lubricating oil was blended with 4 percent by volume of the condensation product prepared according to Example I. Comparative inspections and tests of the identical untreated oil and the treated oil are as follows:

| | Untreated Oil | Treated Oil |
|---|---|---|
| Gravity, °API | 29.3 | 27.8. |
| Viscosity, SUS: | | |
| 100° F | 524 | 545. |
| 210° F | 67.4 | 68.9. |
| Viscosity Index | 107 | 102. |
| Flash, OC, °F | 425 | 460. |
| Fire, OC, °F | 520 | 525. |
| Pour, °F | +5 | −20. |
| Aging Test, 32° F., 24 Hrs | bright | bright. |
| Room Temp., 15 Days | bright | bright. |
| Color, ASTM Union | 1.75 | 2.25. |
| Appearance | bright | bright. |
| Precipitation No | nil | nil. |
| Copper Strip Test, 212° F., 3 Hrs | passes | passes. |
| Corrosion Test, ASTM D 665–46 T Distilled Water: | | |
| Steel Rod, Appearance | rust | bright. |
| Area Rusted, Percent | 100 | 0. |
| Neutralization No | 0.04 | 3.19 alk. |
| Ash as Sulfate, Percent | | 0.16. |
| Engine Test, CRC L–4: | | |
| Engine Condition Rating | failed to complete. | 93. |
| Bearing Loss, Mg./Whole Bearing | | 11. |

As shown above, the condensation products of this invention confer effective detergency and bearing corrosion inhibiting properties. This is shown under the CRC L–4 test. The improvement in rust inhibiting properties is shown under the corrosion test.

While a mineral lubricating oil composition has been shown in the above example, the invention is not to be limited thereto but comprises all mineral oil lubricants to which the condensation products of this invention are added, such as greases and the like. As is known in the art, other additives in addition to the condensation products of our invention can also be employed. Such additives include pour point depressants, viscosity index improvers, antifoam agents, coloring agents, thickeners and the like.

We claim:

1. A lubricant composition comprising a major amount of a mineral lubricating oil and a minor amount, sufficient to confer detergency properties on the composition, of an alkaline earth metal salt of a condensation product of 2 mols of a monoalkylated monohydric phenol having at least 4 carbon atoms in the alkyl group, 2 mols of a lower alkanol, 2 mols of carbon disulfide and from 2 to 3 mols of formaldehyde.

2. The composition of claim 1, wherein the monoalkylated phenol contains from 4 to 12 carbon atoms in the alkyl group.

3. The composition of claim 1, wherein the monoalkylated phenol is tetramethylbutyl phenol.

4. The composition of claim 1, wherein the metal salt is present in an amount of from about 0.1 to 25 percent by weight.

5. The composition of claim 1, wherein the alkaline earth metal is calcium.

References Cited in the file of this patent

UNITED STATES PATENTS

| | | |
|---|---|---|
| 2,410,652 | Griffin et al. | Nov. 5, 1946 |
| 2,647,873 | Matthews et al. | Aug. 4, 1953 |